United States Patent
Davis et al.

(10) Patent No.: US 11,543,041 B2
(45) Date of Patent: Jan. 3, 2023

(54) TWO-PIECE GUIDE BUSHING

(71) Applicant: Halliburton Energy Services, Inc., Houston, TX (US)

(72) Inventors: Jacob Glenn Davis, Duncan, OK (US); John Dexter Brunet, Duncan, OK (US); Justin Lee Hurst, Healdton, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 819 days.

(21) Appl. No.: 16/321,596

(22) PCT Filed: Aug. 25, 2016

(86) PCT No.: PCT/US2016/048560
§ 371 (c)(1),
(2) Date: Jan. 29, 2019

(87) PCT Pub. No.: WO2018/038729
PCT Pub. Date: Mar. 1, 2018

(65) Prior Publication Data
US 2020/0041014 A1   Feb. 6, 2020

(51) Int. Cl.
*F16K 15/06* (2006.01)
*E21D 7/02* (2006.01)

(52) U.S. Cl.
CPC .............. *F16K 15/063* (2013.01); *E21D 7/02* (2013.01)

(58) Field of Classification Search
CPC .................................. F16K 15/063; E21D 7/02
See application file for complete search history.

(56) References Cited

U.S. PATENT DOCUMENTS

| | | | |
|---|---|---|---|
| 1,297,312 A | 3/1919 | Barker | |
| 4,622,993 A | 11/1986 | Taylor | |
| 6,088,898 A | 7/2000 | Lundsten | |
| 7,644,481 B2 | 1/2010 | Kang | |
| 9,032,992 B2* | 5/2015 | Andersson | F16K 25/005 |
| | | | 137/516.29 |
| 10,738,901 B1* | 8/2020 | Andersson | F16K 27/0209 |
| 11,059,154 B2* | 7/2021 | Davis et al. | B25B 23/0021 |
| 2007/0044848 A1 | 3/2007 | Norman | |
| 2012/0247578 A1 | 10/2012 | Brunet et al. | |

(Continued)

FOREIGN PATENT DOCUMENTS

| | | |
|---|---|---|
| JP | 10-138054 A | 5/1998 |
| JP | 5708229 B2 | 4/2015 |

(Continued)

OTHER PUBLICATIONS

Non-Final Office Action dated Jan. 6, 2021, issued in related co-pending U.S. Appl. No. 16/321,619.

(Continued)

*Primary Examiner* — Jessica Cahill
(74) *Attorney, Agent, or Firm* — McGuireWoods LLP

(57) ABSTRACT

Examples of a two-piece guide bushing apparatus are provided. A specific example comprises a guide bushing base comprising flanges which extend into the interior of the guide bushing base, and a guide bushing center comprising a spring clip. The guide bushing center is coupled to the guide bushing base and configured to be removable from the guide bushing base.

20 Claims, 15 Drawing Sheets

(56) References Cited

U.S. PATENT DOCUMENTS

| | | |
|---|---|---|
| 2014/0196266 A1 | 7/2014 | Hung |
| 2015/0190912 A1 | 7/2015 | Liu |
| 2015/0369410 A1 | 12/2015 | Weiland et al. |
| 2016/0160675 A1 | 6/2016 | Williamson et al. |

FOREIGN PATENT DOCUMENTS

| | | |
|---|---|---|
| JP | 2015-208792 A | 11/2015 |
| KR | 101378367 B1 | 3/2014 |

OTHER PUBLICATIONS

International Search Report and Written Opinion dated May 11, 2017 for corresponding PCT Application No. PCT/US2016/048560 (12 pages).

International Search Report and Written Opinion dated May 22, 2017 for corresponding PCT Application No. PCT/US2016/048542 (13 Pages).

* cited by examiner

TWO-PIECE GUIDE BUSHING

TECHNICAL FIELD

The present disclosure relates to guide bushing tools and more particularly to a two-piece guide bushing which allows access to an interior of a conduit without removal of the entirety of the guide bushing.

BACKGROUND

Guide bushings may be placed in conduits to guide the stems of tools through the bushing, to align the stems of tools with a desired orientation, and to reduce the wear of component parts of the tools. For example, guide bushings may be used with valves to reduce contact of the valve stem with other tools, in particular, metal tools. The guide bushing may also be used to maintain the valve stem in its proper orientation when there is fluid flow. Further, the guide bushing may be used to provide improved guidance to the valve stem and to align the different valve components (e.g., by aligning the valve plug with the valve seat a better valve shutoff may be achieved), and similarly, by aligning the valve stem with the packing the leakage past the packing may be reduced.

Over time, the guide bushing may need to undergo maintenance or be replaced, for example, the guide bushing may break or erode due to contact with high pressure fluid jets. In order to perform maintenance or to replace the guide bushing other adjacent tools or adjacent components of other tools (e.g., a valve seat adjacent to the guide bushing) may need to be removed in order to remove the guide bushing. These tools or components may become damaged when removed. As such, maintenance or replacement of the guide bushing may also induce additional expenditures to replace tools or components which were damaged in the process of removing the guide bushing.

Additionally, sometimes the central portion of the guide bushing may block access to the interior of the conduit. Should access to the interior of the conduit become necessary, the guide bushing must be removed. This removal process requires the removal of the other tools or components adjacent to the guide bushing which may result in damage to these tools or components as discussed. Further, even if the removal of the adjacent tools or components does not result in damage, the process of their removal takes additional time which may be problematic should the need for access to the interior of the conduit be urgent.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates to guide bushing tools and more particularly to a two-piece guide bushing which allows access to an interior of a conduit without removal of the entirety of the guide bushing.

Disclosed herein are examples of and methods for using a two-piece guide bushing. The two-piece guide bushing comprises two component pieces which may be separated from each other as desired. One of the component pieces is the guide bushing base. The other component piece is the guide bushing center. The guide bushing base may be coupled to any part of the interior of a conduit, for example, the fluid inlet or outlet. The guide bushing center comprises the stem guide of the bushing and is coupled to the guide bushing base. The guide bushing center may be uncoupled from the guide bushing base and removed from the interior of the conduit as desired. Removal of the guide bushing center does not require removal of the guide bushing base. As such, any other tools or components residing in the conduit adjacent to the guide bushing base may be left in the conduit when the guide bushing center is removed so long as said tools or components do not interfere with removal of the guide bushing center. When removed, the guide bushing center may undergo maintenance or be replaced. The guide bushing center may then be reinstalled by coupling to the guide bushing base. Further, when the guide bushing center is removed from the guide bushing base, the interior of the conduit may be accessed without risk of damage to the guide bushing center. Examples of the present disclosure and its advantages may be understood by referring to FIGS. 1 through 7, where like numbers are used to indicate like and corresponding parts.

Figure 1:
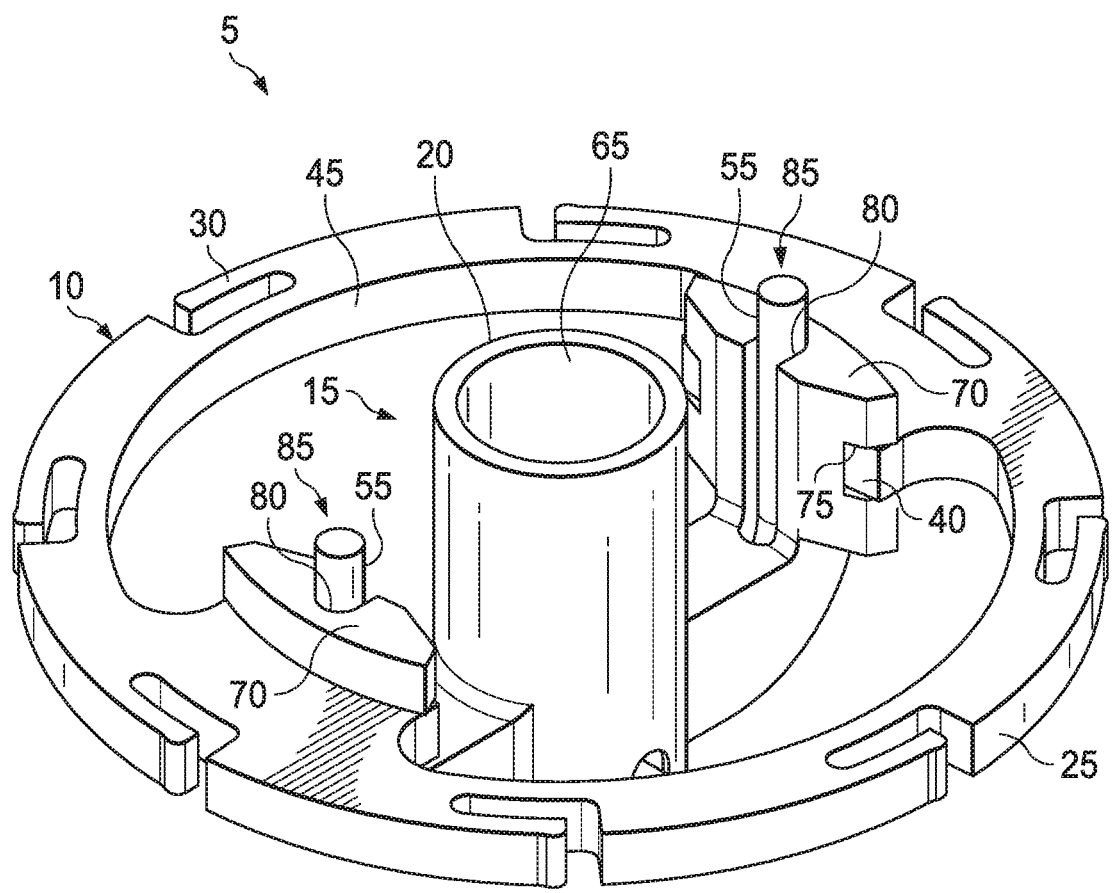
FIG. 1 illustrates an isometric view of a two-piece guide bushing, in accordance with some examples.

FIG. 1 is an isometric view of a two-piece guide bushing, generally 5. The two-piece guide bushing 5 may be placed inside any type of conduit, for example, pumps, tubulars, tanks, etc. Two-piece guide bushing 5 comprises guide bushing base, generally 10, and guide bushing center, generally 15. The guide bushing base 10 is an outer portion of the two-piece guide bushing 5. The guide bushing base 10 couples the two-piece guide bushing 5 to the interior of the conduit. The guide bushing base 10 may also be coupled to the guide bushing center 15. The guide bushing base 10 holds the guide bushing center 15 in position in the conduit. The guide bushing center 15 comprises the stem guide 20 through which a stem of an adjacent tool may be inserted, for example, a valve stem. The stem guide functions to guide and position the stem in the conduit so that the stem may resist movement due to contact with fluids or other materials in the conduit. Further, the stem guide protects the stem from contact with other materials, which may reduce wear on the stem.

Figure 2A:
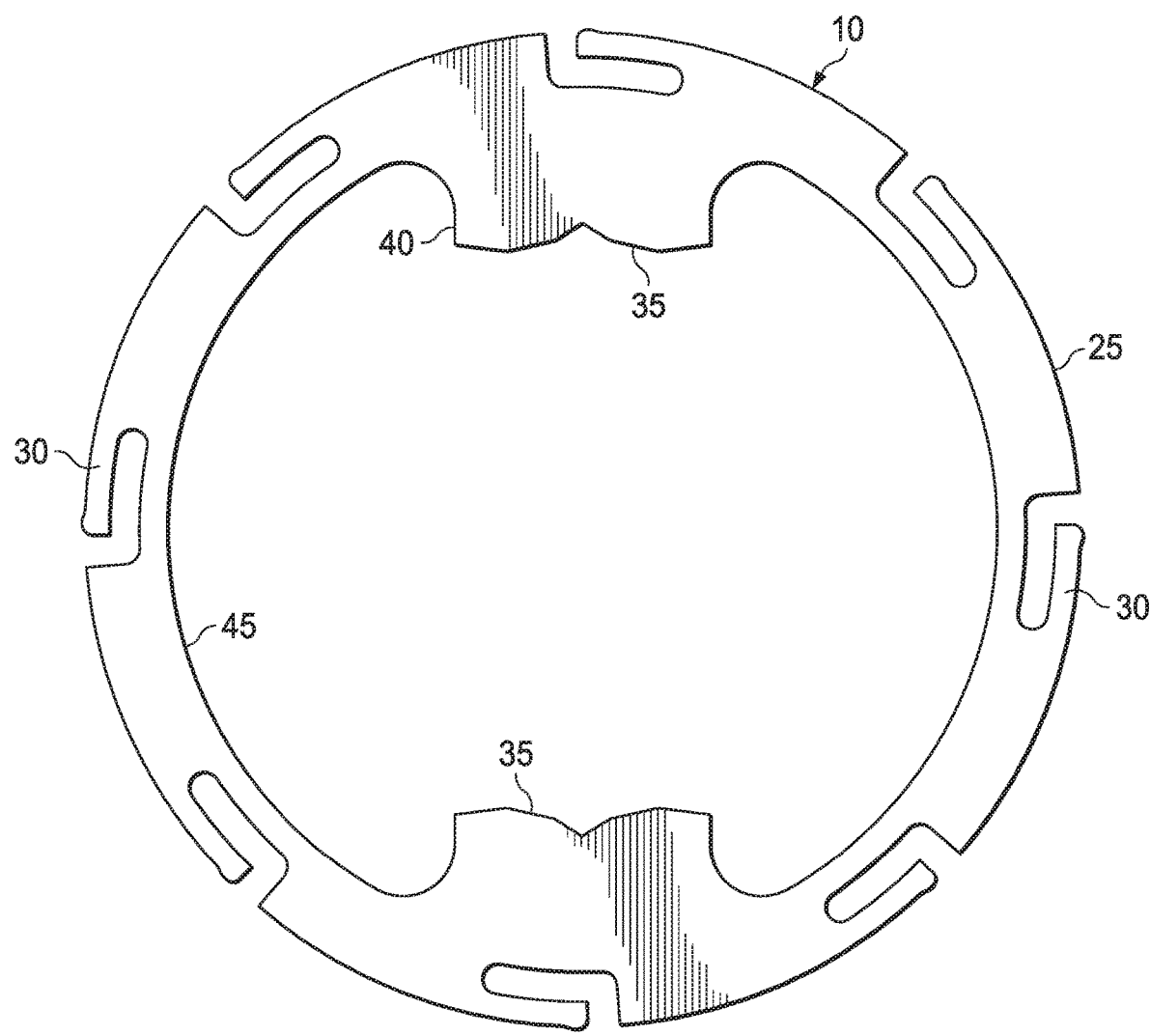
FIG. 2A illustrates a cross-section of the guide bushing base, in accordance with some examples.

FIG. 2A is a cross-section of the guide bushing base 10. The guide bushing base 10 may be constructed of any type of steel alloy, for example, stainless steel. Although the guide bushing base 10 is depicted as generally circular in cross-section, it is to be understood that the guide bushing base 10 may be any shape sufficient for installation in a specific conduit. The guide bushing base 10 comprises an outer surface 25. The outer surface 25 contacts the inner surface of a conduit in which the two-piece guide bushing 5 is to be inserted. The two-piece guide bushing 5 may be self-retaining and comprise its own retaining mechanism for coupling to the inner surface of the conduit. For example, in the example illustrated in FIG. 2A, the outer surface 25 comprises cantilever arms 30. The cantilever arms 30 may deform to provide a modified press fit of the outer surface 25 of the guide bushing base 10 against the inner surface of a conduit. The cantilever arms 30 may keep the two-piece guide bushing 5 centered in the conduit and may prevent rotation of the guide bushing base 10 when the guide bushing center 15 is decoupled from the guide bushing base 10. In some alternative examples, other methods of coupling the guide bushing base 10 to the inner surface of the conduit may be used. For example, the outer surface 25 of the guide bushing base 10 may comprise an O-ring used to seal the guide bushing base 10 to the inner surface of the conduit. The O-ring may be made of deformable elastomeric materials so as to allow the guide bushing base 10 to be fit into the inner surface of the conduit and therein pressed against the inner surface of the conduit. The O-ring may be positioned within a groove cut in the outer surface 25 of the guide bushing base 10 to hold the O-ring in position in the guide bushing base 10. In some alternative examples, the two-piece guide bushing 5 may not be self-retaining. For example, the guide bushing base 10 may be coupled to the inner surface of the conduit with an adhesive. The adhesive may be any adhesive sufficient for adhering the material of the guide bushing base 10 to the material of the inner surface of the conduit. With the benefit of this disclosure, one of ordinary skill in the art will be readily able to select a retaining mechanism sufficient for use for a desired application.

With continued reference to FIG. 2A, the guide bushing base 10 comprises two grooves 35 which are visible from the profile of the cross-section of FIG. 2A. The grooves 35 are positioned on the extreme end of individual flanges 40 which project outward from the inner diameter 45 of the guide bushing base 10 towards the center of the guide bushing base 10. The flanges 40 fit within gaps within the guide bushing center 15 as illustrated in FIG. 1 and as discussed below.

Figure 2B:
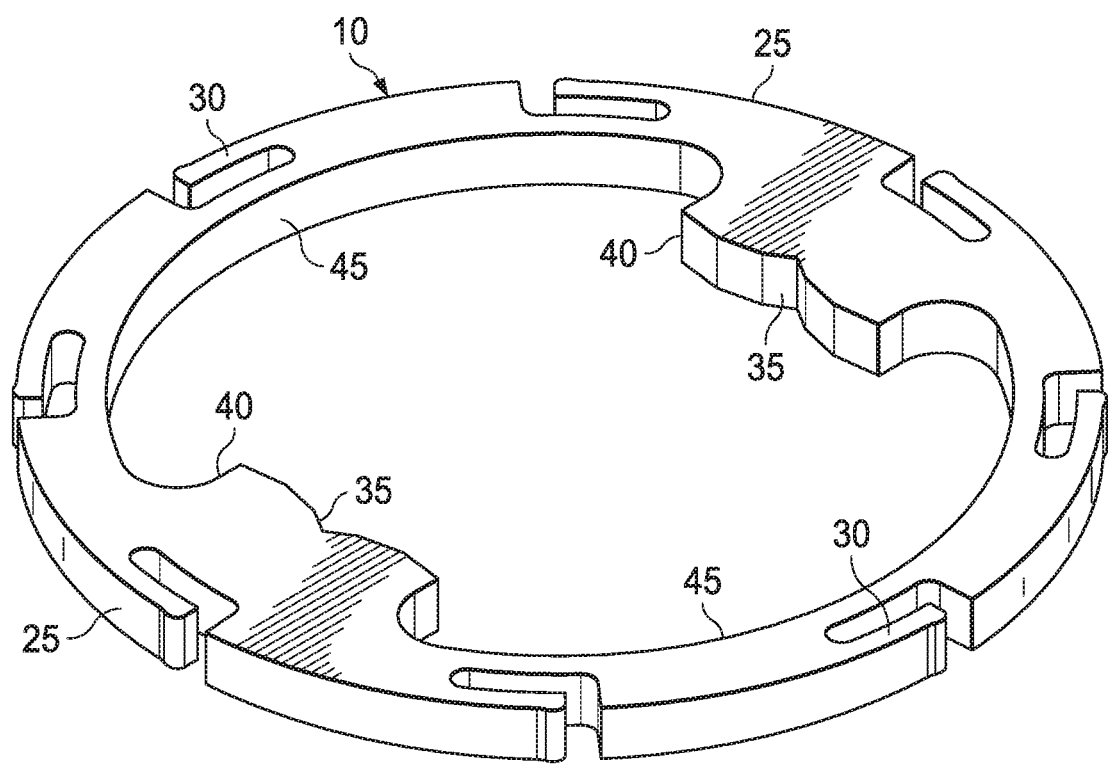
FIG. 2B illustrates an isometric view of the guide bushing base, in accordance with some examples.

FIG. 2B provides an isometric view of the guide bushing base 10. The flanges 40 comprise an angled contact surface for the grooves 35. The grooves 35 are used to hold the guide bushing center 15 in place during operation. The angled contact surface is angled such that the slope of the grooves 35 provides the correct entrance and departure angle for installation and removal of the guide bushing center 15 from the guide bushing base 10. Although the guide bushing base 10 is illustrated as one continuous piece, it is to be understood that the guide bushing base 10 may comprise multiple component parts fashioned together to produce the guide bushing base 10, for example, the guide bushing base may comprise an O-ring fit within the outer surface 25 of the guide bushing base 10.

Figure 3:
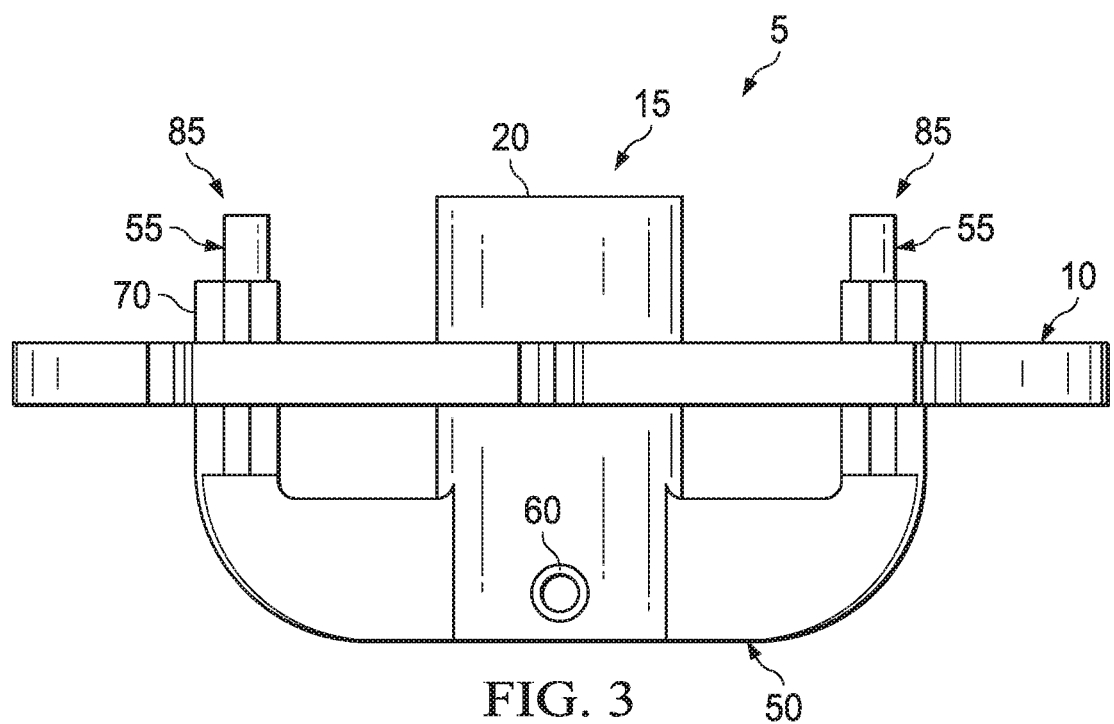
FIG. 3 illustrates a cross-section of the two-piece guide bushing, in accordance with some examples.

Turning to FIG. 3, FIG. 3 illustrates an example cross-section of the two-piece guide bushing 5. In the illustrated example, the guide bushing center 15 is coupled to the guide bushing base 10. The stem guide 20 projects through the inner diameter 45 (as illustrated in FIGS. 1, 2A, and 2B) of the guide bushing base 10. The stem guide 20 may be adjacent to the spring clip retainer 50, which is illustrated as being below the stem guide 20 in FIG. 3. The spring clip retainer 50 comprises the portion of the guide bushing center 15 which retains the spring clip 55 therein. The spring clip retainer 50 may be one continuous piece with the stem guide 20 as illustrated in FIG. 3 or, alternatively, may be a separate component coupled to stem guide 20 as illustrated in FIG. 1. The stem guide 20 and the spring clip retainer 50 may be constructed of any type of steel alloy, for example, stainless steel. As discussed, spring clip 55 resides within spring clip retainer 50 and is held in place by roll pin 60.

With continued reference to FIG. 3 and also with reference to FIG. 1, stem guide 20 comprises a cavity 65 (as illustrated in FIG. 1) in the inner diameter of the stem guide 20. The stem of another tool or the stem component of another tool may be inserted into the cavity 65 of the stem guide 20. The stem guide 20 may guide the stem or stem component, align the stem or stem component, protect the stem or stem component, etc. The stem or stem component may be the stem or stem component of any desired tool, for example, a valve stem.

With continued reference to FIG. 3 and also with reference to FIG. 1, guide bushing center 15 comprises flange holder 70. The flange holder 70 may be one continuous piece with the stem guide 20 as illustrated in FIG. 1 or, alternatively, may be a separate component coupled to stem guide 20 as illustrated in FIG. 3. The flange holder 70 may be constructed of any type of steel alloy, for example, stainless steel. Flange holder 70 comprises flange slot 75 (as illustrated in FIG. 1) through which flange 40 of the guide bushing base 10 may be inserted. The flange 40 is aligned with flange slot 75 and such that guide bushing center 15 may be oriented in the position illustrated in FIGS. 1 and 3. Flange holder 70 further comprises spring clip slot 80 (as illustrated in FIG. 1). Spring clip slot 80 retains the free ends of spring clip 55 in the position illustrated in FIGS. 1 and 3. The free ends, generally 85, of spring clip 55 may be biased outward against spring clip slot 80 and also against groove 35 of guide bushing base 10, disposed within flange holder 70, such that the biasing maintains the guide bushing center 15 in the correct orientation, illustrated in FIGS. 1 and 3, during operational use of the two-piece guide bushing 5.

Figure 4A:
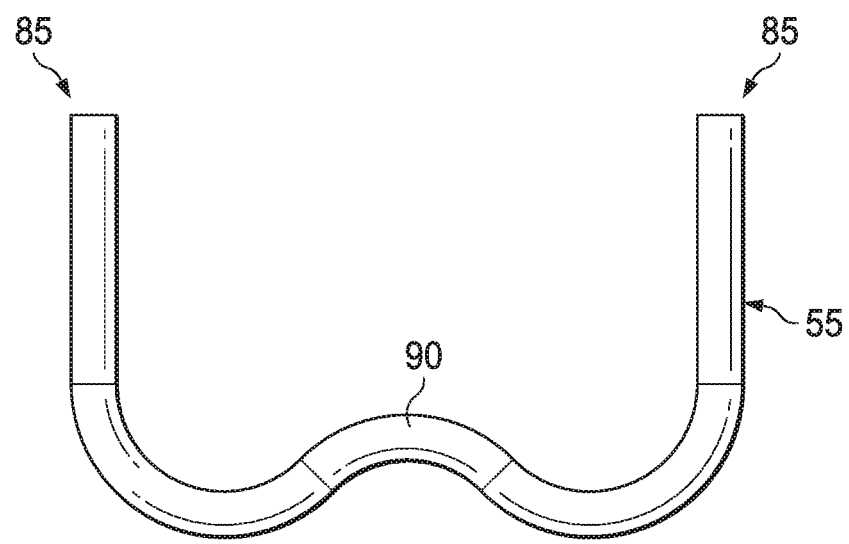
FIG. 4A illustrates a cross-section of a spring clip, in accordance with some examples.
Figure 4B:
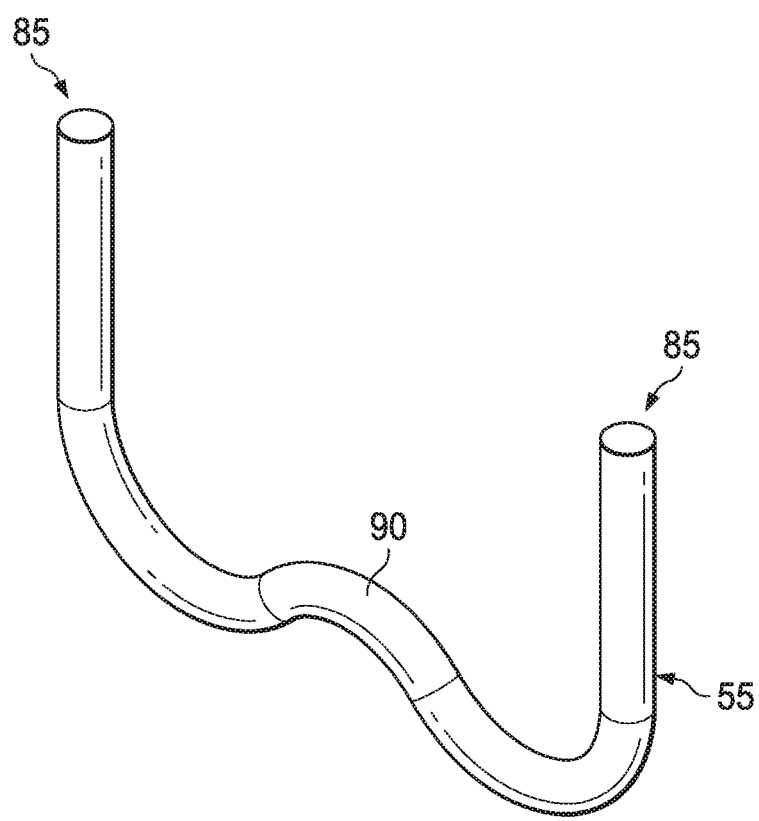
FIG. 4B illustrates an isometric view of the spring clip, in accordance with some examples.

FIG. 4A is a cross-section of spring clip 55. FIG. 4B is an isometric view of spring clip 55. Spring clip 55 may be constructed of any type of steel alloy, for example, stainless steel. Spring clip 55 is elastically deformable and designed to allow for the free ends 85 to be biased outwards. Maintaining spring clip 55 in elastic deformation allows for the installation and removal of the guide bushing center 15 multiples times without a loss of properties and maintains correct operating standards. The deformation of the spring clip 55 maintains the biasing force against the grooves 35 of the guide bushing base 10 when the flanges 40 of the guide bushing base 10 are inserted into the flange slots 75 of the flange holders 70 of the guide bushing center 15. The biasing force exerted by the free ends 85 against grooves 35 and the positioning of the flanges 40 within the flange slots 75 of the flange holders 70 allow the guide bushing center 15 to be coupled to the guide bushing base 10. Spring clip 55 further comprises an arc 90 through which roll pin 60 is inserted.

With reference to FIGS. 1 and 3, roll pin 60 holds spring clip 55 in place within spring clip retainer 50. Roll pin 60 is illustrated as extending through spring clip retainer 50. Roll pin 60 may be constructed of any type of steel alloy, for example, stainless steel.

Figure 5:
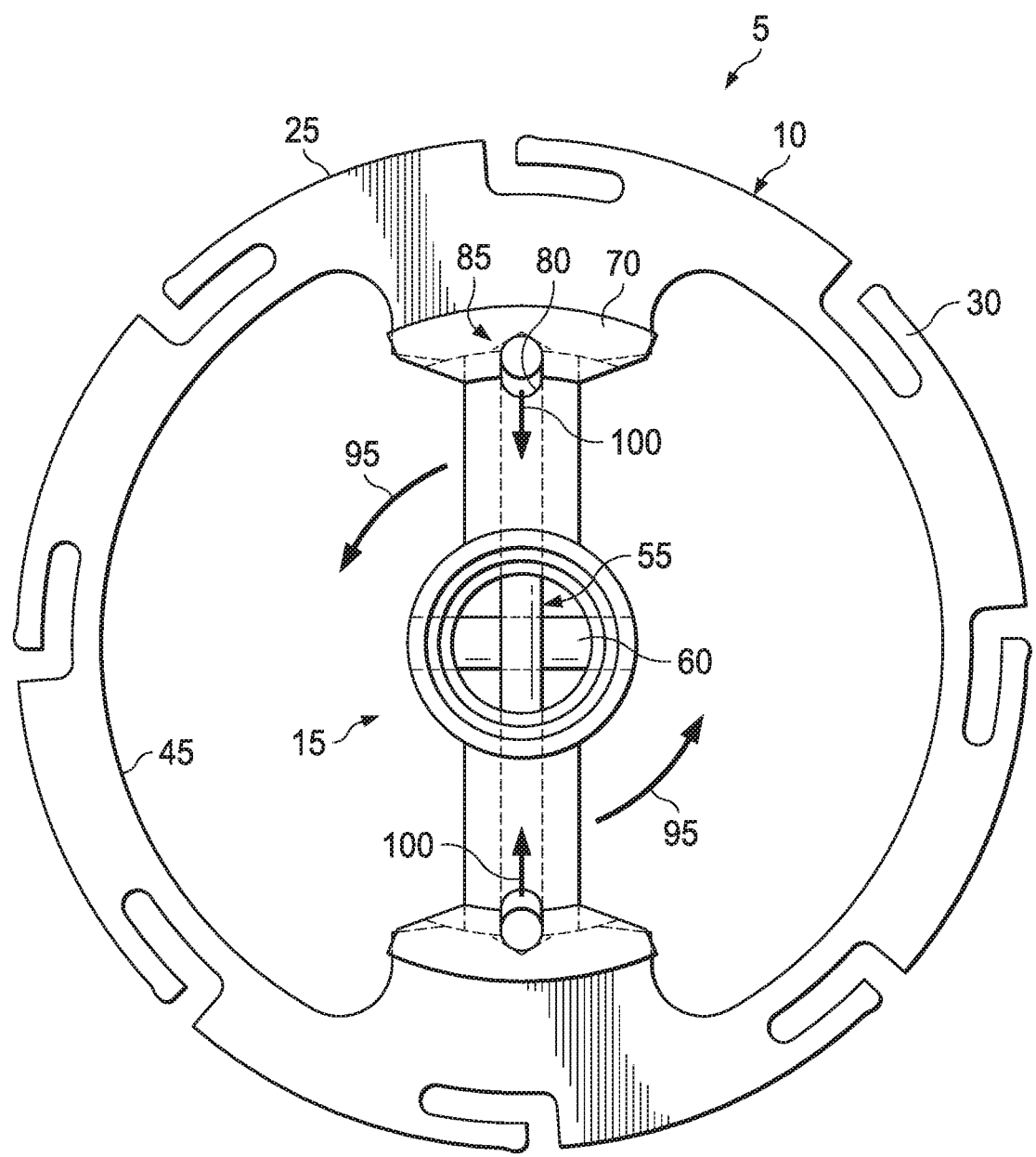
FIG. 5 illustrates the method of removing the guide bushing center from the guide bushing base, in accordance with some examples.

FIG. 5 illustrates the method of removing the guide bushing center 15 from the guide bushing base 10. To remove the guide bushing center 15 from the guide bushing base 10, the guide bushing center 15 is rotated in the direction of arrows 95. When pressure is applied in the direction of the arrows the free ends 85 of the spring clip 55 are caused to move within the grooves 35. As discussed above, the contact surfaces of the grooves 35 are angled such that the free ends 85 are allowed to move inward as indicated by arrows 100. As the guide bushing center 15 is rotated, the free ends 85 are thus moved inward which frees the free ends 85 from the grooves 35 of the flanges 40 of the guide bushing base 10. The guide bushing center 15 may then be removed from the guide bushing base 10. The guide bushing center 15 may then undergo maintenance or be replaced as desired. To install the guide bushing center 15 into the guide bushing base 10, the flange slot 75 of the flange holders 70 is aligned with the flanges 40 of the guide bushing base 10. The guide bushing center 15 is then rotated in the direction of arrows 95 while the free ends 85 of the spring clip 55 are pressed inward in the direction of arrows 100. When the free ends 85 of the spring clip 55 are aligned with the grooves 35 of the guide bushing base 10, the free ends 85 may be released. The outward biasing of the free ends 85 of the spring clip 55 will hold the guide bushing center 15 in the illustrated orientation with the guide bushing base 10.

Figure 6:
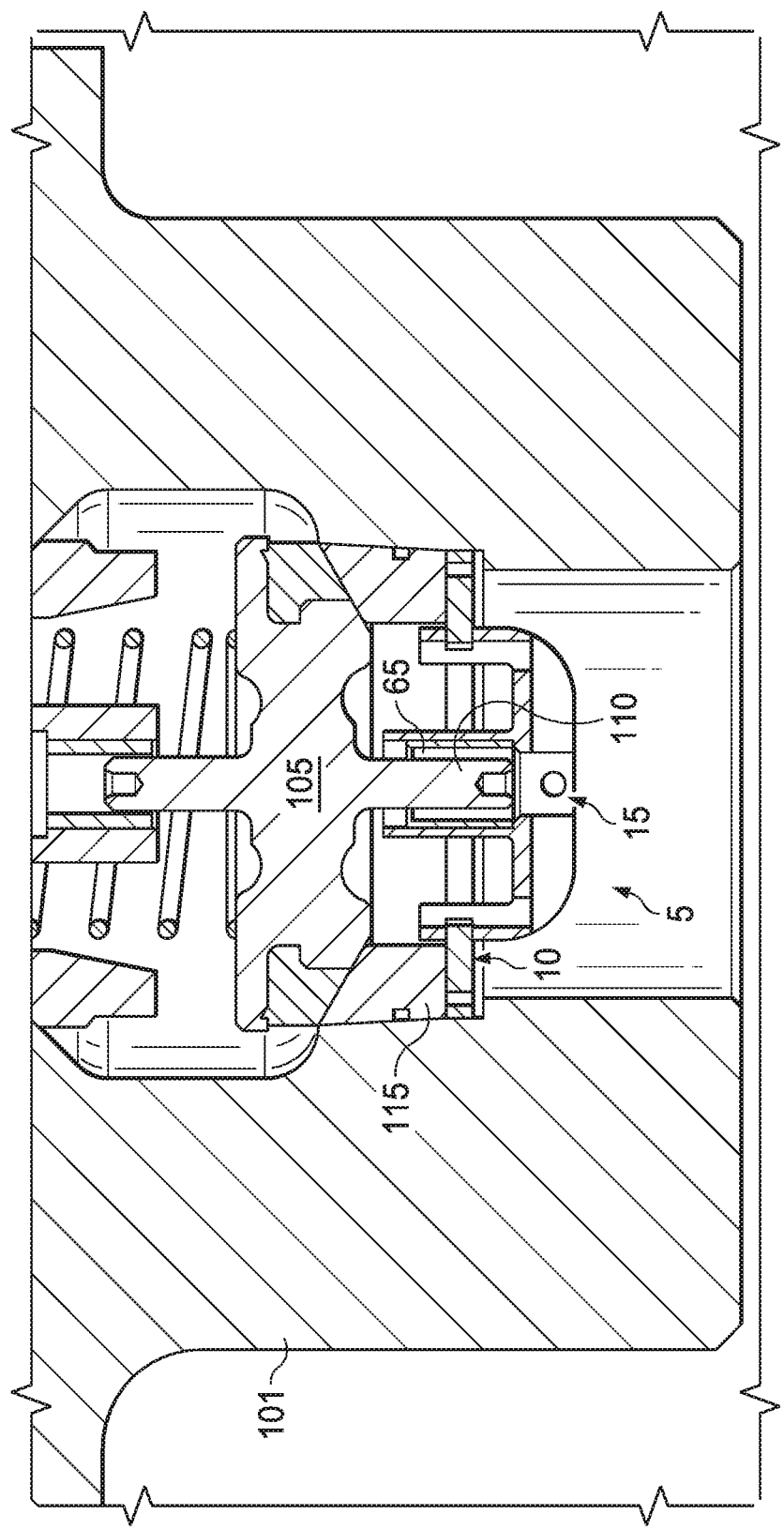
FIG. 6 illustrates a cross-section of a two-piece guide bushing installed in a conduit.

FIG. 6 illustrates a cross-section of a two-piece guide bushing 5 installed in a conduit 101. The two-piece guide bushing 5 is engaged with a tool 105, which is illustrated as a valve. The stem 110 of the tool 105 is disposed within the cavity 65 of the guide bushing center 15. As illustrated, the two-piece guide bushing 5 may be used to guide, align, and/or protect the stem 110 of the tool 105. The tool 105 rests on a seat 115, illustrated as a valve seat, within conduit 101. The seat 115 is a separate component of tool 105. The seat 115 is anchored into the conduit 101 and is positioned adjacent the guide bushing base 10.

Figure 7:
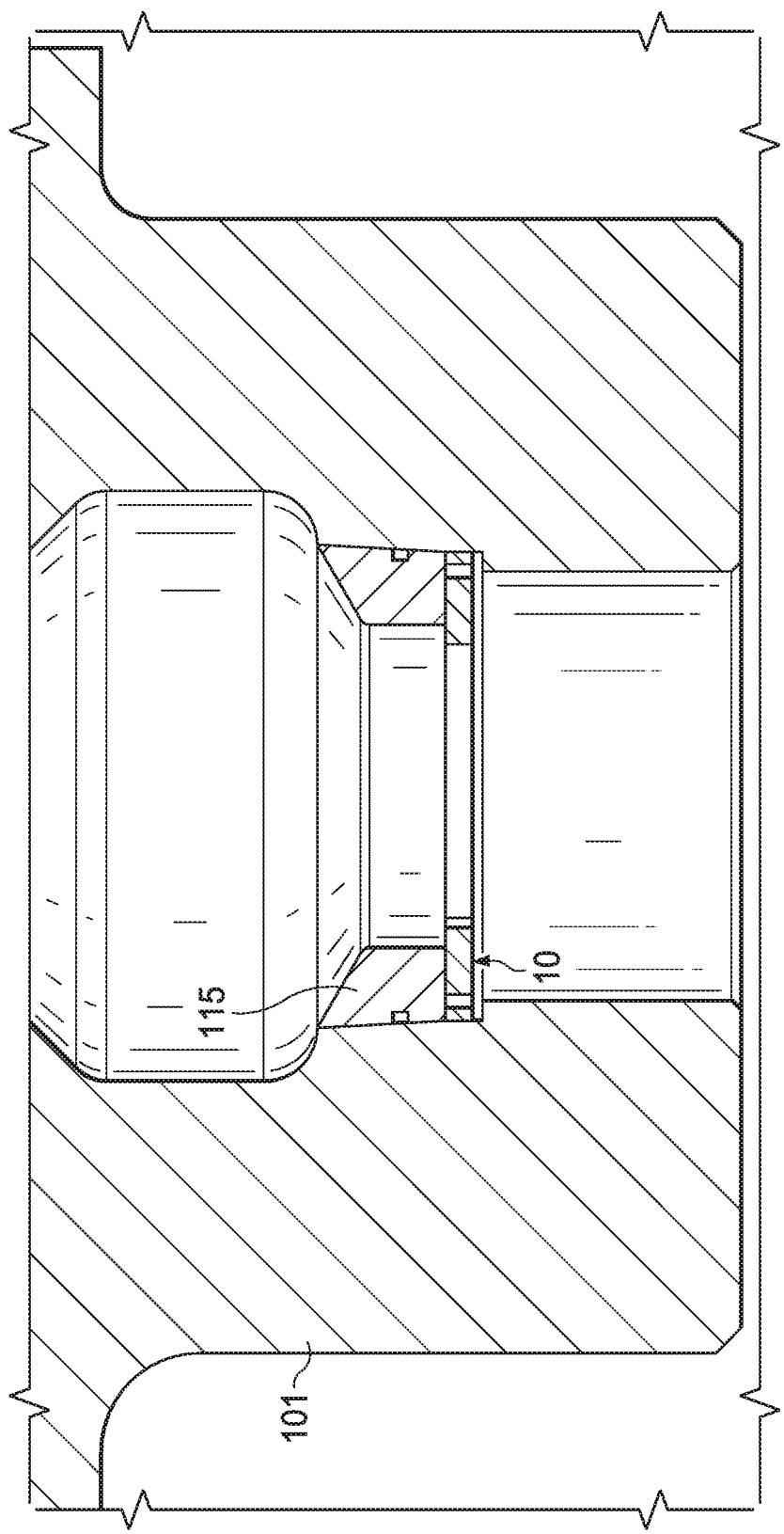
FIG. 7 illustrates a cross-section of the two-piece guide bushing of FIG. 6 with the guide bushing center removed, in accordance with some examples.

FIG. 7 illustrates a cross-section of the two-piece guide bushing 5 of FIG. 6 with the guide bushing center 15 removed. When it is desired to remove the guide bushing center 15, the tool 105 (as illustrated in FIG. 6) may be removed. The guide bushing center 15 may then be decoupled from the guide bushing base 10 as described above and as illustrated in FIG. 5. The guide bushing base 10 is left in the conduit 101. Because the guide bushing base 10 is left in the conduit 101, the seat 115 of the tool 105 may also be left in the conduit 101. As such, the seat 115 may remain anchored in the conduit 101, and there is no risk of damaging the seat 115 by removing its anchoring from the conduit 101. The guide bushing center 15 may thus be removed for repair or replacement without risk of damage to components which are affixed to the conduit 101 and are adjacent to the guide bushing base 10. The interior of the conduit 101 may be accessed. In some examples, a plurality of two-piece guide bushings 5 may be installed in a conduit 101. The guide bushing center 15 of one or more two-piece guide bushings 5 may be removed to allow access to other tools 105 or other two-piece guide bushings 5. Further, as the guide bushing base 10 and any seats 115 remain in the conduit 101, the time required to reinstall a tool 105 of guide bushing center 15 may be reduced.

In some examples, the two-piece guide bushing 5 may be difficult to remove by hand (e.g., the two-piece guide bushing 5 may be out of reach and/or the guide bushing center 15 may be difficult to turn). In these examples, the use of a guide bushing removal tool may be useful to remove the two-piece guide bushing 5 from the conduit 101.

Figure 8:
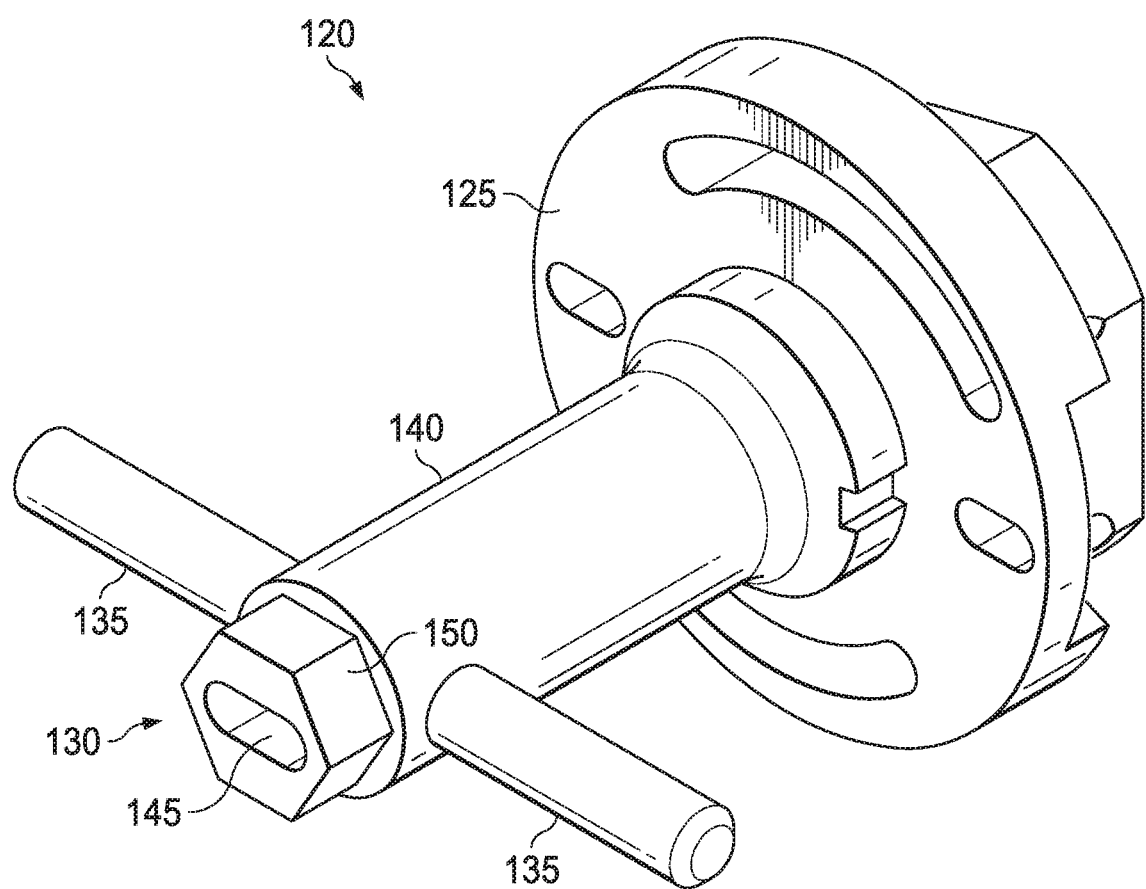
FIG. 8 illustrates an isometric view of an example guide bushing removal tool.

FIG. 8 illustrates an isometric view of an example guide bushing removal tool 120. The guide bushing removal tool 120 comprises a cap 125 and a handle, generally 130, which extends away from the cap 125. The cap 125 fits over and couples to the two-piece guide bushing 5 as explained below. The handle 130 is coupled to the cap 125 and extends away from the cap 125 a desired distance. The handle 130 may be utilized to turn the cap 125, which may consequently turn the guide bushing center 15 coupled to the cap 125.

Handle 130 generally comprises a handle bar 135 and a handle base 140. Handle bar 135 may be any such shape sufficient for gripping and turning handle 130. In the illustrated example, handle bar 135 is illustrated as having a T-shape. In alternative examples, the handle bar 135 may comprise a circular or semi-circular shape. A handle base 140 may comprise any desired length. In some examples, the handle base 140 may be adjustable so that it may be extended to reach a two-piece guide bushing 5 disposed a great distance within a conduit (e.g., conduit 101 as illustrated in FIGS. 6 and 7). In alternative examples, handle base 140 may not be extendible. In examples, handle base 140 is coupled to cap 125 by any sufficient manner. For example, handle base 140 may be coupled to cap 125 by a threaded connection, a welded connection, adhesive, etc. In some examples, handle bar 135 and handle base 140 may be separate pieces. In some alternative examples, handle bar 135 and handle base 140 may be one continuous piece. In some examples, handle base 140 and cap 125 may be separate pieces. In some alternative examples, handle base 140 and cap 125 may be one continuous piece. In some optional embodiments, the handle 130 may further comprise an insertion slot 145. Insertion slot 145 may be used to hold a flathead tool, which may be inserted and turned to apply additional torque to the handle 130. In some optional embodiments, the head 150 of the handle 130 may be shaped such that it may be gripped by a wrench or other instrument in a manner analogous to that of gripping a bolt head. In the illustrated example, the head 150 is hexagonally shaped. In alternative examples, the head 150 may have a quadrilateral shape or any other such shape sufficient for gripping with a wrench or the like. The shaped head 150 may be used to apply additional torque to the handle 130 as desired (e.g., if the two-piece guide bushing 5 has become damaged and the guide bushing center 15 does not release easily form the guide bushing base 10). The handle 130 and any of its components may be constructed of any type of steel alloy (e.g., stainless steel or carbon steel).

Figure 9:
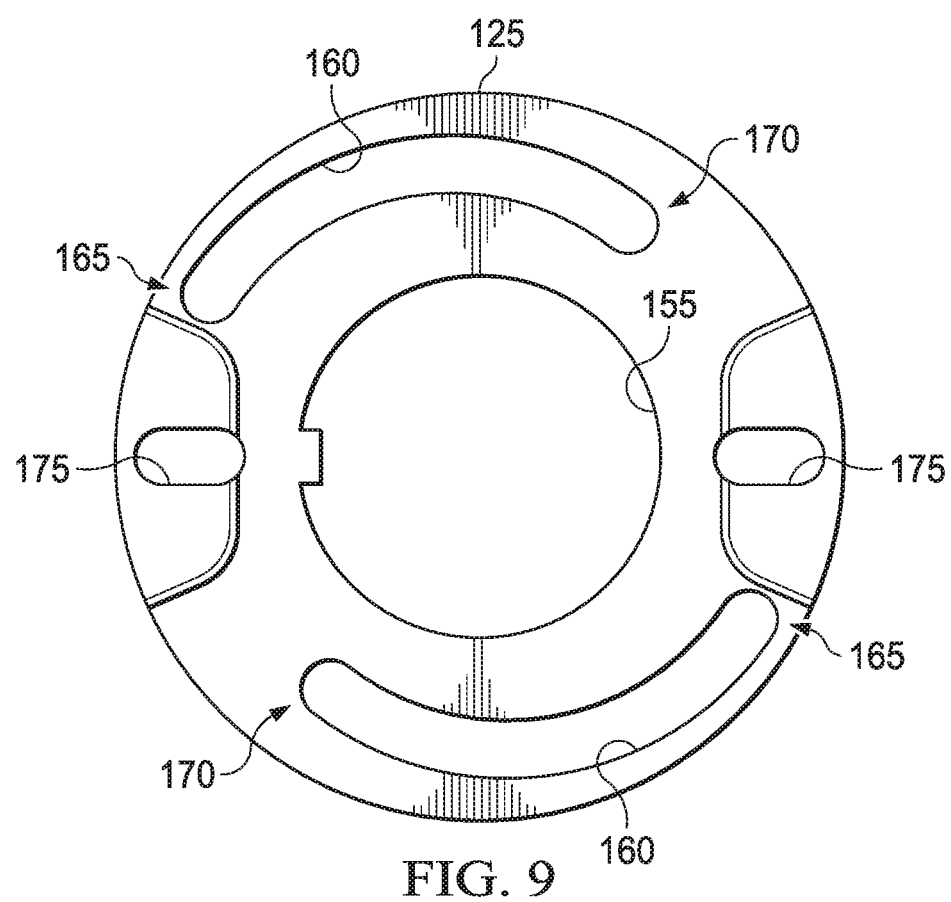
FIG. 9 illustrates a cross-section of the underside of the cap of the example guide bushing removal tool of FIG. 8.

Now referring to FIG. 9, a cross-section of the underside of cap 125 is illustrated. Cap 125 comprises a central cavity 155. The handle base 140 may be coupled to the cavity 155. A raised boss (described below) may also be coupled to the cavity 155. Cap 125 further comprises arced slots 160. The free ends 85 (as illustrated in FIGS. 1, 3, 4A, 4B, 5, etc.) of the spring clip 55 may be inserted in the outer end 165 of the arced slots 160. "Outer," as used to describe the outer end 165 of the arced slot 160, is the end of an arced slot 160 closest in proximity to the outer diameter of the cap 125. When the cap 125 is rotated (in the clockwise direction when turning from above) the free ends 85 move toward the inner ends 170 of the arced slots 160. "Inner," as used to describe the inner end 170 of the arced slot 160, is the end of an arced slot 160 closest in proximity to the inner diameter of the cap 125. As the free ends 85 move towards the inner ends 170, they are pushed inward overcoming the biasing force exerted by the free ends 85 against grooves 35 of the guide bushing base 10 and releasing the guide bushing center 15 from the guide bushing base 10 as described above. Although arced slots 160 have been angled such that rotation (when viewed from above) to release the guide bushing center 15 is clockwise, it is to be understood that the arced slots 160 may be angled in the opposite direction such that the cap 125 may be rotated counter-clockwise to release the guide bushing center 15 from the guide bushing base 10. Cap 125 further comprises installation slots 175. The free ends 85 (as illustrated in FIGS. 1, 3, 4A, 4B, 5, etc.) of the spring clip 55 may be inserted in the installation slots 175. The smaller size of the installation slots 175 restricts rotational movement of the free ends 85. Installation slots 175 are of such a length that the free ends 85 may be moved inward within installation slots 175. The installation slots 175 may be used to hold the free ends 85 in place when the guide bushing center 15 is installed in the guide bushing base 10. The guide bushing removal tool 120 may grip and hold the guide bushing center 15 as it is lowered into the guide bushing base 10. The installation slots 175 hold the free ends 85 such that they are only allowed to move inward and outward over the angled contact surfaces of the grooves 35 of the guide bushing base 10. When the free ends 85 of the spring clip 55 are positioned in the center of the grooves 35, the guide bushing removal tool 120 maybe pulled up and off of the two-piece guide bushing 5. The cap 125 and any of its components may be constructed of any type of steel alloy (e.g., stainless steel or carbon steel).

Figure 10:
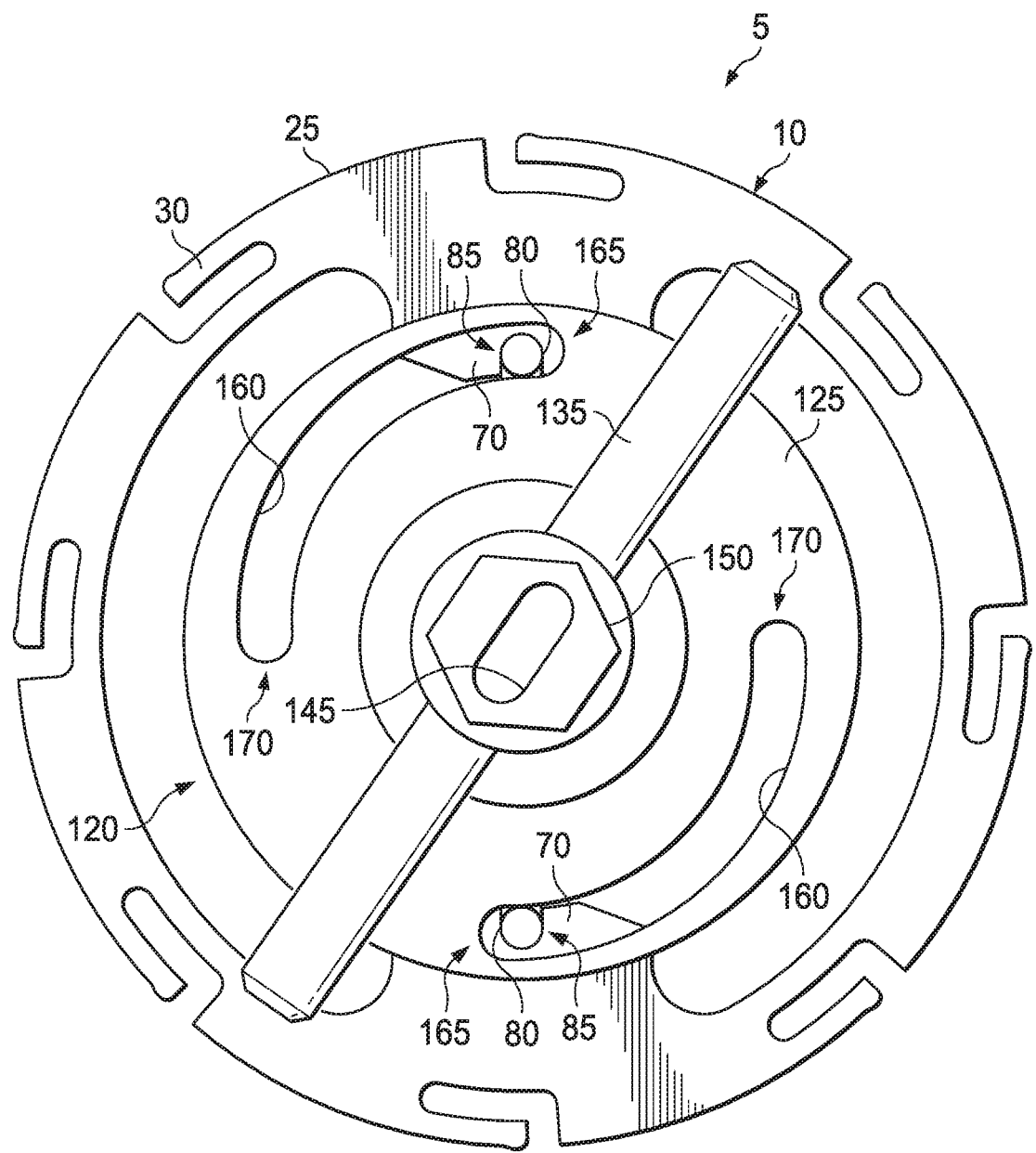
FIG. 10 illustrates a top-down perspective of the example guide bushing removal tool of FIG. 8 attached to the two-piece guide bushing.

FIG. 10 illustrates a top-down perspective of the guide bushing removal tool 120 attached to the two-piece guide bushing 5. From this perspective, the free ends 85 of the spring clip 55 (as illustrated in FIG. 1, etc.) can be viewed as positioned in the spring clip slot 80 of the flange holder 70 of the guide bushing center 15 (as illustrated in FIG. 1, etc.). When the handle bar 135 is used to apply torque in the clockwise direction, the cap 125 is rotated such that the outer ends 165 of the arced slots 160 moves away from the free ends 85, and the inner ends 170 of the arced slots 160 moves toward the free ends 85. As the inner ends 170 moves towards the free ends 85, the biasing force of the free ends 85 is overcome and the free ends 85 are pushed inwards toward the center of the guide bushing center 15 in the direction of the inner ends 170. Consequently, the free ends 85 are pushed out of groove 35 as described above, and the guide bushing center 15 may be released from the guide bushing base 10.

Figure 11:
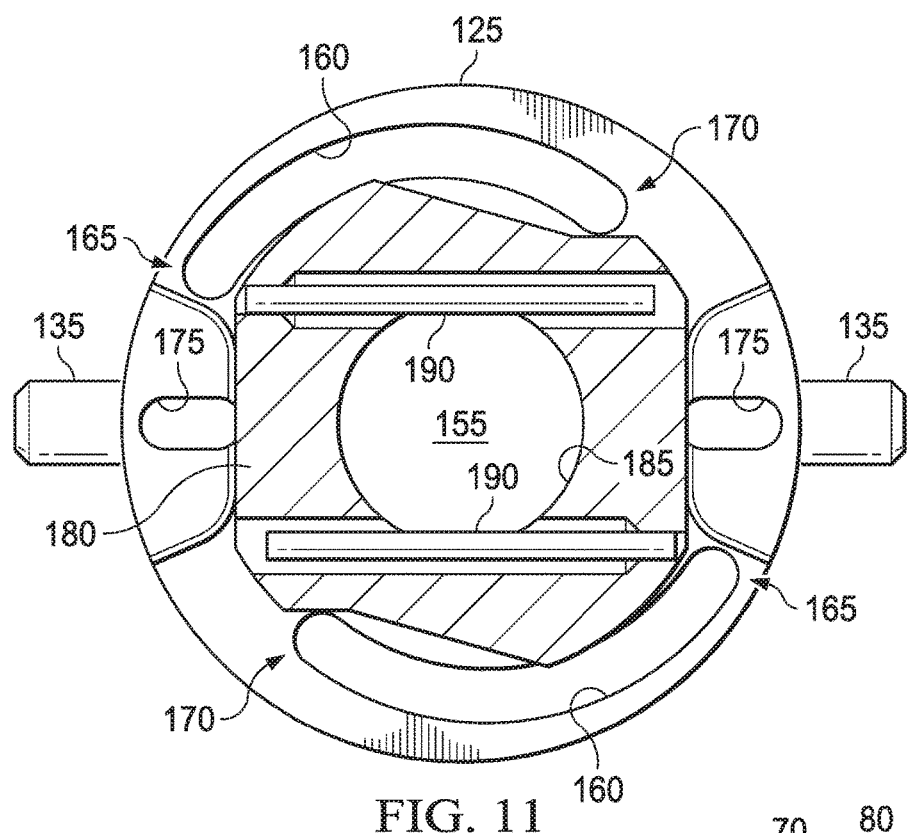
FIG. 11 illustrates a cross-section of the underside of the cap and raised boss of the example guide bushing removal tool of FIG. 8.

With reference to FIG. 11, a cross-section of the underside of cap 125 and raised boss 180 is illustrated. Raised boss 180 extends underneath the cap 125 and may be coupled to the cap 125 by any sufficient means such as a threaded connection, welding, adhesive, etc. In some examples, raised boss 180 may be one continuous piece with cap 125. As will be illustrated below, raised boss 180 extends below cap 125 such that when the raised boss 180 is fully lowered over the two-piece guide bushing 5, the top of the spring clip retainer 50 will contact the underside of the raised boss 180 preventing further downward movement of the guide bushing removal tool 120. Raised boss 180 also comprises a cavity 185 positioned adjacent to cavity 155 of cap 125. The stem guide 20 of the guide bushing center 15 (as illustrated in FIGS. 1 and 3) may be inserted through cavity 155 and cavity 185. The raised boss 180 may be constructed of any type of steel alloy (e.g., stainless steel or carbon steel). Raised boss further comprises deformable grips 190. Deformable grips 190 are elastically deformable and deform around the stem guide 20 when inserted into cavity 185 of raised boss 180. The deformable grips 190 hold the stem guide 20, and consequently the guide bushing center 15, so that it may be raised or lowered into or out of a conduit when released from the guide bushing base 10. In an example, the deformable grips 190 comprise wire springs. In another example, the deformable grips 190 comprise metal bars of sufficiently small diameter to deform around stem guide 20 without deforming or warping stem guide 20. The deformable grips 190 may be any shape and made of any elastically deformable material sufficient for gripping and holding stem guide 20. Examples of materials for the deformable grips include metals such as steel alloys, plastics such as rubbers and other elastomers, etc.

Figure 12:
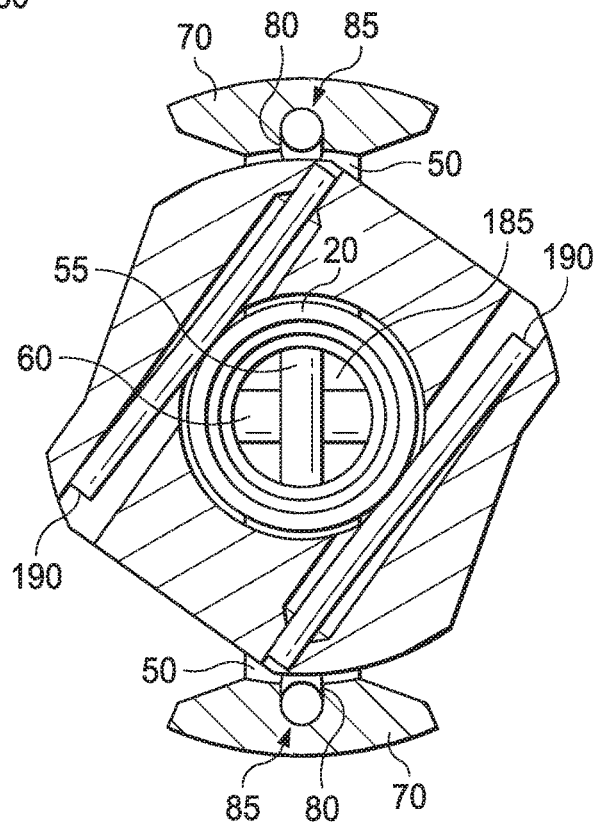
FIG. 12 illustrates a cross-section of the raised boss unattached to the cap and placed above the spring clip retainer of the guide bushing center.

FIG. 12 illustrates a cross-section of the raised boss 180 unattached to the cap 125 and placed above the spring clip retainer 50 of the guide bushing center 15 (obscured). As illustrated, stem guide 20 is positioned within cavity 185 of raised boss 180, and deformable grips 190 deform the grip stem guide 20. Deformable grips may hold stem guide 20, and consequently guide bushing center 15, for removal or installation. Additionally, deformable grips may assist in the positioning of guide bushing center 15 within guide bushing base 10.

Figure 13:
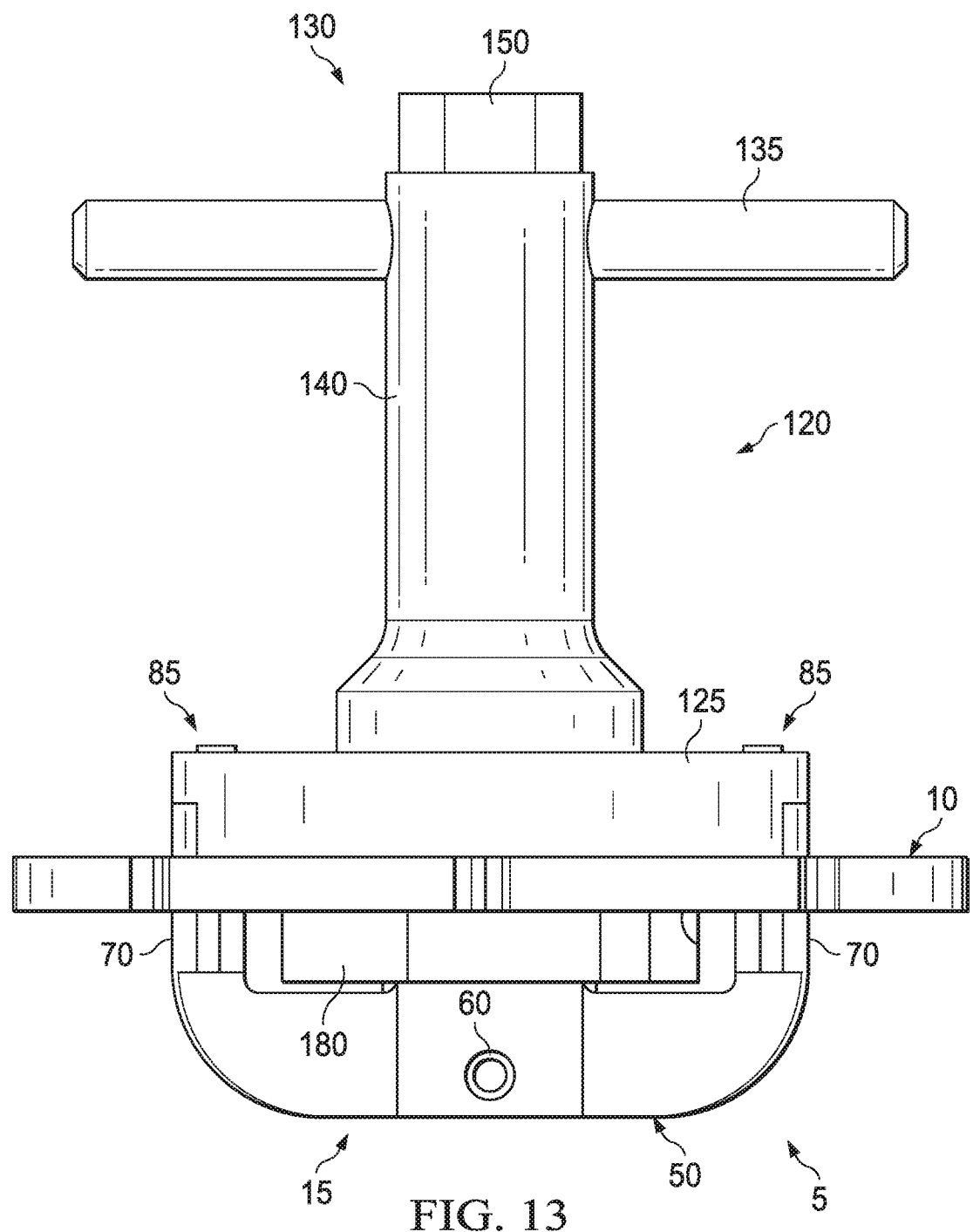
FIG. 13 illustrates a side view of the guide bushing removal tool of FIG. 8 coupled to the two-piece guide bushing.

FIG. 13 illustrates a side view of the guide bushing removal tool 120 coupled to the two-piece guide bushing 5. From this perspective it can be seen that the raised boss 180 is of a desired width underneath the cap 125 such that it contacts the topside of spring clip retainer 50, and further downward movement of the guide bushing removal tool 120 is prevented. Likewise, the length of raised boss 180 extends downward a desired distance such that free ends 85 are able to be positioned within the arced slots 160 or installation slots 175 of cap 125. The raised boss 180 may be of sufficient dimensions that the guide bushing center 15 may be aligned with the raised boss 180 when the guide bushing removal tool 120 is coupled to the guide bushing center 15.

Figure 14:
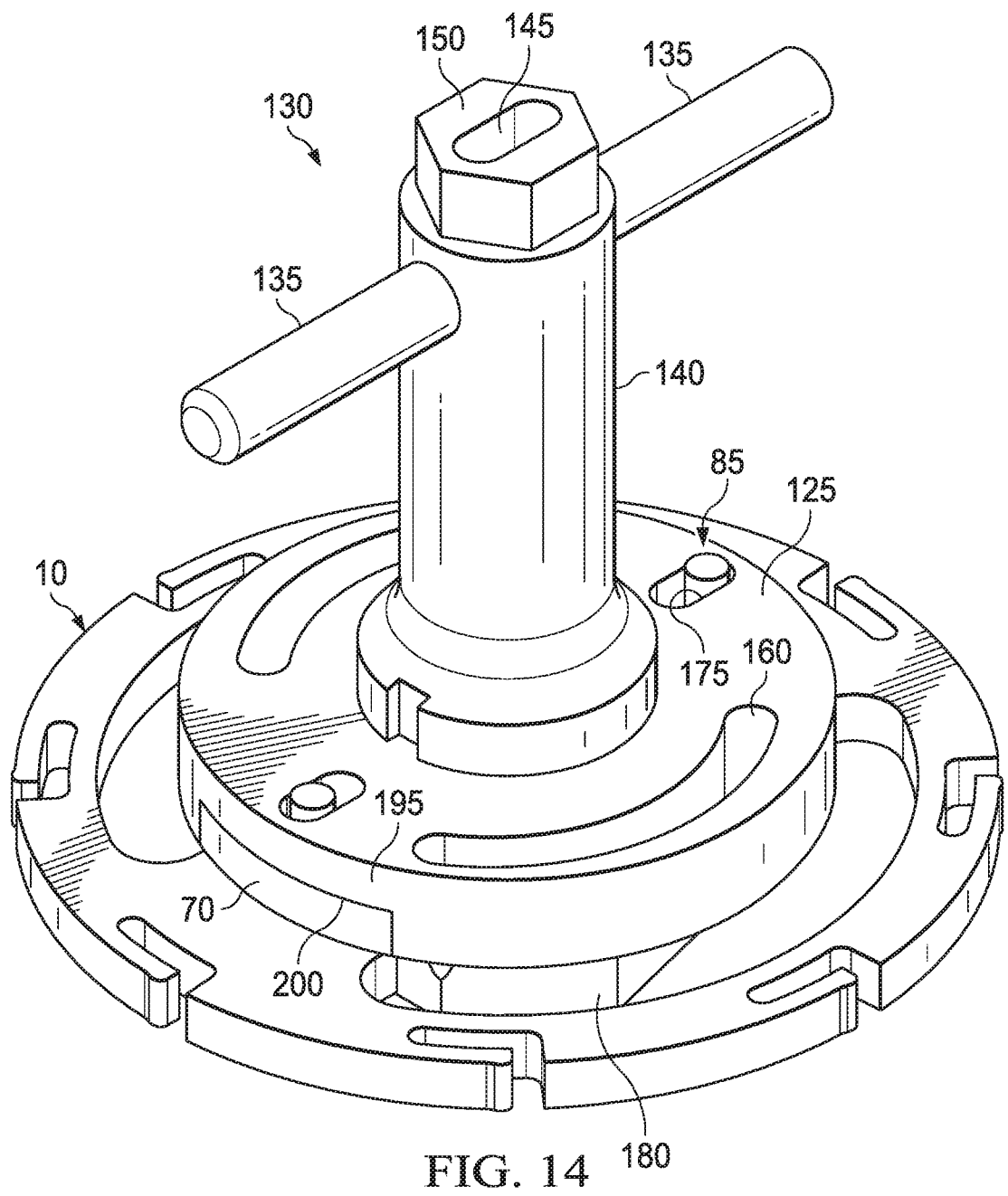
FIG. 14 illustrates an isometric view of the guide bushing removal tool of FIG. 8 coupled to the two-piece guide bushing.

FIG. 14 illustrates an isometric view of the guide bushing removal tool 120 coupled to the two-piece guide bushing 5. From this perspective, a lip 195 of the cap 125 may be seen. The lip 195 extends underneath cap 125 a desired distance and overhangs such that the lip 195 may contact the tops of flanges 40 of the guide bushing base 10. The lip 125 allows the guide bushing center 15 to be aligned with the guide bushing base 10 and does not allow the guide bushing removal tool 120 to pass below this level. When the lip 125 strikes the flanges 40, the guide bushing removal tool 120 may then be rotated until the flanges 40 slide into the flange slots 75 of the flange holders 70. The flange holders 70 are aligned with and positioned in pockets 200 which may be milled out or otherwise carved into the profile of lip 195.

Figure 15:
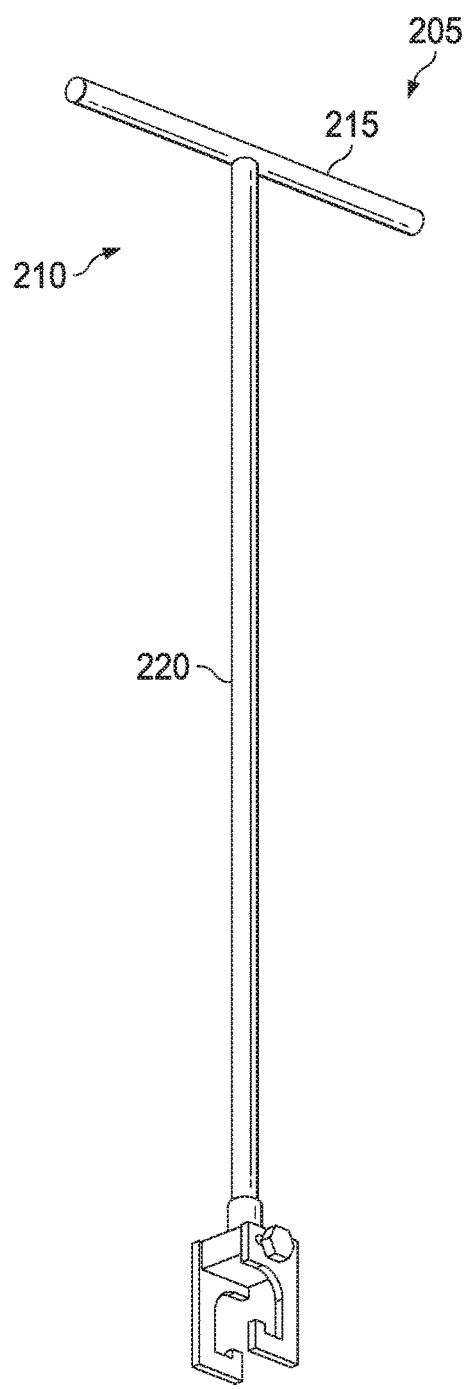
FIG. 15 illustrates an isometric view of another example of a guide bushing removal tool.

FIG. 15 illustrates an example of a guide bushing removal tool, generally 205. Guide bushing removal tool 205 comprises a handle, generally 210. Handle 210 may generally comprise a handle bar 215 and a handle base 220. Handle bar 215 may be any such shape sufficient for gripping and turning handle 210. In the illustrated example, handle bar 215 is illustrated as having a T-shape. In alternative examples, the handle bar 215 may comprise a circular or semi-circular shape. The handle base 220 may comprise any desired length. In some examples, the handle base 220 may be adjustable so that it may be extended to reach a two-piece guide bushing 5 disposed a great distance within a conduit (e.g., conduit 101 as illustrated in FIGS. 6 and 7). In alternative examples, handle base 220 may not be extendible. In some examples, handle bar 215 and handle base 220 may be separate pieces. In some alternative examples, handle bar 215 and handle base 220 may be one continuous piece. The handle 210 and any of its components may be constructed of any type of steel alloy (e.g., stainless steel or carbon steel).

Guide bushing removal tool 205 further comprises grip, generally 225. Grip 225 may be used to grab the guide bushing center 15 and rotate it such that it is released from guide bushing base 10. Grip 225 may also be used to hold guide bushing center 15 as it is removed from a conduit (e.g., conduit 101 as illustrated in FIGS. 6 and 7). The grip 225 and any of its components may be constructed of any type of steel alloy (e.g., stainless steel or carbon steel).

Figure 16:
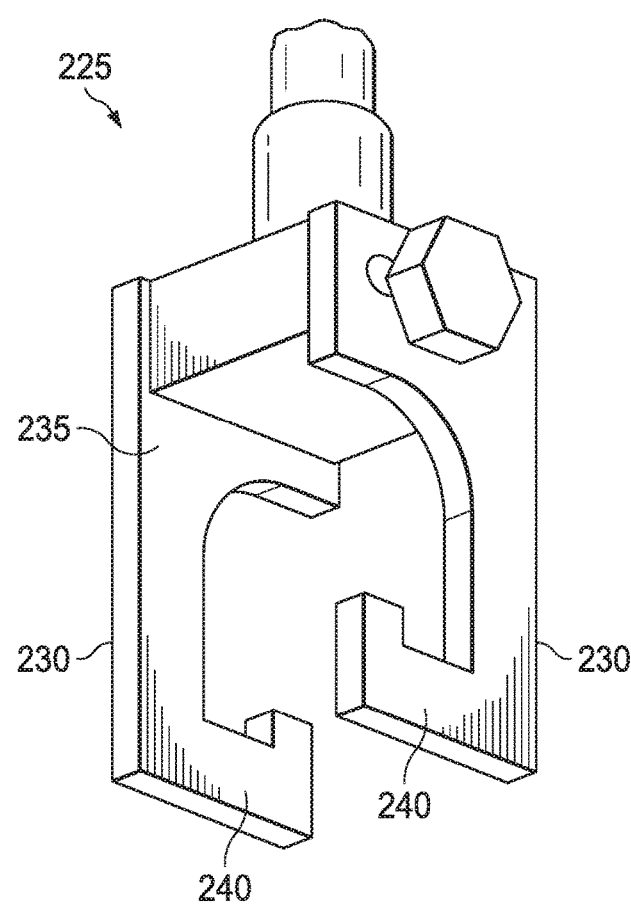
FIG. 16 illustrates an isometric view of the grip of the guide bushing removal tool of FIG. 15.

Now referring to FIG. 16, an enlarged view of grip 225 is illustrated. Grip 225 comprises arms 230. Arms 230 may hold the spring clip retainer 50 when grip 225 is rotated about spring clip retainer 50. For example, grip 225 may be inserted such that the interior faces 235 of arms 230 faces the sides of the spring clip retainer 50 and runs parallel with the sides of the spring clip retainer 50. Handle 210 may then be rotated clockwise to rotate grip 225 and consequently arms 230. Although clockwise rotation is the rotation described because of the orientation of the arms 230, it is to be understood that the orientation of the arms 230 may be changed and/or the shape of the arms 230 may be changed to utilize counter-clockwise rotation if desired. When rotated, the interior faces 235 of the arms 230 should approach a perpendicular orientation with the spring clip retainer 50. In this orientation, the hook portion 240 of arms 230 prevents the spring clip retainer 50 from releasing from the arms 230. The grip 225 comprises two arms 230 positioned opposite each other and facing in opposing directions. Although the arms 230 are generally depicted as comprising a J-shape, it is to be understood that the arms 230 may comprise any shape sufficient for being rotated around the spring clip retainer 50 and for preventing the release of the spring clip retainer 50 when rotated around the spring clip retainer 50. When rotated fully, the arms 230 will hold the spring clip retainer 50 and allow the guide bushing center 15 to be rotated within the guide bushing base 10 with sufficient force to overcome the biasing force of the free ends 85 of the spring clip 55 against groove 35, and the free ends 85 may then be pushed clear of groove 35 as described above, and the guide bushing center 15 may be released from the guide bushing base 10. Once released, the guide bushing center 15 may still be held by the grip 225, allowing the guide bushing center 15 to be pulled from the conduit (e.g., conduit 101 as illustrated in FIGS. 6 and 7) without the need for removal of the guide bushing base 10 or any associated seats, etc. of adjacent components to the guide bushing base 10 (e.g., seat 115 as illustrated in FIGS. 6 and 7).

Figure 17:
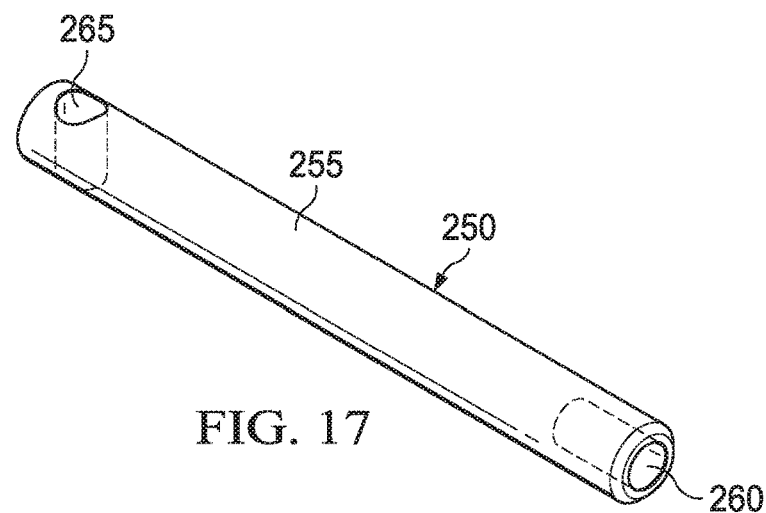
FIG. 17 illustrates an isometric view of another example of the guide bushing removal tool.

FIG. 17 illustrates an isometric view of another example of a guide bushing removal tool, generally 250. Guide bushing removal tool 250 comprises a body 255. Body 255 is illustrated as having a generally cylindrical shape with a hollow end 260 running lengthwise. The hollow end 260 comprises an inner diameter of sufficient length to fit over the free ends 85 of the spring clip 55. The body 255 may also comprise an additional optional opening 265 at some distance along the body 255. Opening 265 may run widthwise through the body 255. Guide bushing removal tool 250 and any of its components may be constructed of any type of steel alloy (e.g., stainless steel or carbon steel).

Figure 18:
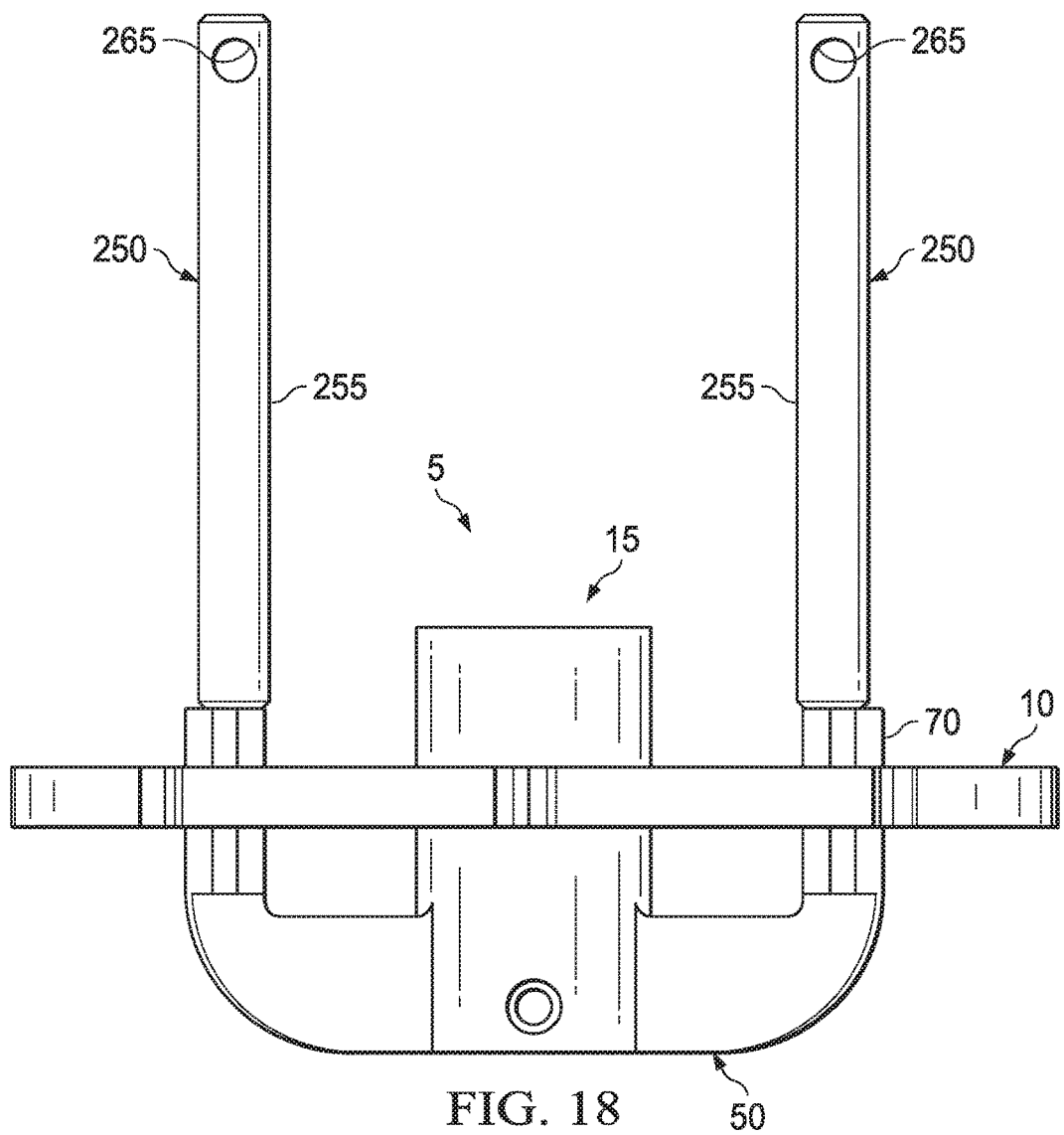
FIG. 18 illustrates a cross-section of the example guide bushing removal tool of FIG. 17 coupled to the two-piece guide bushing.

FIG. 18 illustrates a cross-section of the guide bushing removal tool 250 coupled to a two-piece guide bushing 5. The hollow end (e.g., hollow end 260 as illustrated in FIG. 17) of the guide bushing removal tool 250 is fitted over the free ends (e.g., free ends 85 as illustrated in FIG. 1) of the spring clip (e.g., spring clip 55 as illustrated in FIG. 1). The guide bushing removal tool 250 essentially extends the length of the free ends 85 such that they may be actuated at a longer distance. Each of the guide bushing removal tools 250 may be grasped and with sufficient force applied, the biasing force of the free ends 85 of the spring clip 55 against groove 35 may be overcome. The free ends 85 may then be pushed clear of groove 35 as described above, and the guide bushing center 15 may be released from the guide bushing base 10. The hollow end 260 may be coupled to the free ends 85 using any suitable means (e.g., the hollow end 260 may comprise a threaded opening which couples to a threaded end of the free ends 85). Alternatively, the hollow end 260 may comprise an elastomeric material which may be wedged over the free ends 85 as the hollow end 260 is pushed on top of the free ends 85. Opening 265 may be used to tie two of the guide bushing removal tools 250 together with a rope, chain, string, thread, and the like. The tying piece may then be grasped and pulled on to pull the guide bushing removal tools 250 towards each other at the end comprising the opening 265. Additionally, opening 265 may be used to tie two or more of the guide bushing removal tools 250 for transport and storage.

Examples of a two-piece guide bushing apparatus are provided. A specific example comprises a guide bushing base comprising flanges which extend into the interior of the guide bushing base, and a guide bushing center comprising a spring clip; the guide bushing center coupled to the guide bushing base and configured to be removable from the guide bushing base. The flanges may comprise grooves which engage with the spring clip. The guide bushing center may comprise a roll pin which engages with the spring clip. The guide bushing center may further comprise a spring clip retainer and the spring clip may be disposed within the spring clip retainer. The guide bushing base may comprise cantilever arms on an outer surface. The guide bushing base may comprise an O-ring on an outer surface. The guide bushing center may further comprise a flange holder with a flange slot in which the flanges may be inserted. The guide bushing center may further comprise a cavity.

Methods for accessing an interior of a conduit comprising a two-piece guide bushing are provided. An example method comprises providing a two-piece guide bushing comprising: a guide bushing base comprising flanges which extend into the interior of the guide bushing base, and a guide bushing center comprising a spring clip; the guide bushing center coupled to the guide bushing base and configured to be removable from the guide bushing base; removing the guide bushing center from the guide bushing base, wherein the guide bushing base remains in the conduit; and accessing the interior of the conduit. The conduit may further comprise a valve and a valve seat located adjacent to the two-piece guide bushing, wherein the valve seat is not removed from the conduit when the guide bushing center is removed from the conduit. The method may further comprise recoupling the guide bushing center to the guide bushing base after accessing the conduit. The flanges may comprise grooves which engage with the spring clip. The guide bushing center may comprise a roll pin which engages with the spring clip. The guide bushing center may further comprise a spring clip retainer and the spring clip may be disposed within the spring clip retainer. The guide bushing base may comprise cantilever arms on an outer surface. The guide bushing base may comprise an O-ring on an outer surface. The guide bushing center may further comprise a flange holder with a flange slot in which the flanges may be inserted. The guide bushing center may further comprise a cavity.

Provided are systems for accessing an interior of a conduit comprising a two-piece guide bushing. An example system comprises a conduit; and a two-piece guide bushing comprising: a guide bushing base coupled to the interior of the conduit and comprising flanges which extend into the interior of the guide bushing base, and a guide bushing center comprising a spring clip; the guide bushing center coupled to the guide bushing base and configured to be removable from the guide bushing base. The guide bushing center may further comprises a cavity in which the stem of a tool is inserted. The conduit may further comprise a valve and a valve seat located adjacent to the two-piece guide bushing, wherein the valve seat is not removed from the conduit when the guide bushing center is removed from the conduit. The flanges may comprise grooves which engage with the spring clip. The guide bushing center may comprise a roll pin which engages with the spring clip. The guide bushing center may further comprise a spring clip retainer and the spring clip may be disposed within the spring clip retainer. The guide bushing base may comprise cantilever arms on an outer surface. The guide bushing base may comprise an O-ring on an outer surface. The guide bushing center may further comprise a flange holder with a flange slot in which the flanges may be inserted.

Examples of a removal tool for a two-piece guide bushing are provided. A specific example comprises a handle, a cap coupled to the handle, the cap comprising arced slots; and a raised boss coupled to the cap, the raised boss configured to fit over the stem guide of a two-piece guide bushing. The arced slots may be configured to fit over the free ends of a spring clip of the two-piece guide bushing. The guide bushing removal tool may be coupled to the two-piece guide bushing and the guide bushing removal tool may be configured such that rotation of the handle releases the guide bushing center of the two-piece guide bushing. The handle may comprise a hexagonally shaped head. The handle may comprise a head and the head may comprise an insertion slot. The handle and the cap may be one continuous piece. The cap and the raised boss may be one continuous piece. The cap may comprise at least one installation slot. The cap may comprise a lip. The raised boss may comprise deformable grips. The deformable grips may comprise wire springs. The deformable grips may comprise a steel alloy. The handle may comprise a steel alloy. The cap may comprise a steel alloy. The raised boss may comprise a steel alloy.

Examples of a removal tool for a two-piece guide bushing are provided. A specific example comprises a handle, a grip coupled to the handle, the grip comprising two arms positioned opposite of each other and facing opposing directions. The arms may be J-shaped. The handle and the grip may comprise a steel alloy.

Examples of a removal tool for a two-piece guide bushing are provided. A specific example comprises a cylindrical body comprising a hollow end disposed in one end of the cylindrical body; wherein the hollow end is configured to fit on the free ends of a spring clip of a two-piece guide bushing. The hollow end may comprise a threaded end configured to couple with a corresponding threaded end of the free ends of the spring clip of the two-piece guide bushing.

Therefore, the disclosed systems and methods are well adapted to attain the ends and advantages mentioned, as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative embodiments disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A two-piece guide bushing comprising:
   a guide bushing base comprising flanges which extend into the interior of the guide bushing base, and
   a guide bushing center comprising a spring clip and a spring clip retainer and the spring clip is disposed within the spring clip retainer; the guide bushing center coupled to the guide bushing base and configured to be removable from the guide bushing base; wherein the flanges comprise grooves which engage with the spring clip.

2. The two-piece guide bushing of claim 1, wherein the guide bushing center comprises a roll pin which engages with the spring clip.

3. The two-piece guide bushing of claim 1, wherein the guide bushing base comprises cantilever arms on an outer surface.

4. The two-piece guide bushing of claim 1, wherein the guide bushing base comprises an O-ring on an outer surface.

5. The two-piece guide bushing of claim 1, wherein the guide bushing center further comprises a flange holder with a flange slot in which the flanges may be inserted.

6. The two-piece guide bushing of claim 1, wherein the guide bushing center further comprises a cavity.

7. A method for accessing an interior of a conduit comprising a two-piece guide bushing, the method comprising:
   providing a two-piece guide bushing comprising:

a guide bushing base comprising flanges which extend into the interior of the guide bushing base, and a guide bushing center comprising a spring clip and a spring clip retainer and the spring clip is disposed within the spring clip retainer; the guide bushing center coupled to the guide bushing base and configured to be removable from the guide bushing base;

removing the guide bushing center from the guide bushing base, wherein the guide bushing base remains in the conduit; and accessing the interior of the conduit.

8. The method of claim 7, wherein the conduit further comprises a valve and a valve seat located adjacent to the two-piece guide bushing, wherein the valve seat is not removed from the conduit when the guide bushing center is removed from the conduit.

9. The method of claim 7, further comprising recoupling the guide bushing center to the guide bushing base after accessing the conduit.

10. The method of claim 7, wherein the flanges comprise grooves which engage with the spring clip.

11. The method of claim 7, wherein the guide bushing center comprises a roll pin which engages with the spring clip.

12. The method of claim 7, wherein the guide bushing base comprises cantilever arms on an outer surface.

13. The method of claim 7, wherein the guide bushing base comprises an O-ring on an outer surface.

14. The method of claim 7, wherein the guide bushing center further comprises a flange holder with a flange slot in which the flanges may be inserted.

15. A system for accessing an interior of a conduit comprising a two-piece guide bushing, the system comprising:

a conduit; and a two-piece guide bushing comprising:

a guide bushing base coupled to the interior of the conduit and comprising flanges which extend into the interior of the guide bushing base, and a guide bushing center comprising a spring clip and a spring clip retainer and the spring clip is disposed within the spring clip retainer; the guide bushing center coupled to the guide bushing base and configured to be removable from the guide bushing base.

16. The system of claim 15, wherein the conduit further comprises a valve and a valve seat located adjacent to the two-piece guide bushing, wherein the valve seat is not removed from the conduit when the guide bushing center is removed from the conduit.

17. The system of claim 15, wherein the flanges comprise grooves which engage with the spring clip.

18. The system of claim 15, wherein the guide bushing center comprises a roll pin which engages with the spring clip.

19. The system of claim 15, wherein the guide bushing center further comprises a cavity in which the stem of a tool is inserted.

20. The system of claim 15, wherein the guide bushing base comprises an O-ring on an outer surface.

* * * * *